US006799419B2

(12) United States Patent
Rösel et al.

(10) Patent No.: US 6,799,419 B2
(45) Date of Patent: Oct. 5, 2004

(54) METHOD FOR DIAGNOSING AN EXHAUST GAS CLEANING SYSTEM OF A LAMBDA-CONTROLLED INTERNAL COMBUSTION ENGINE

(75) Inventors: Gerd Rösel, Regensburg (DE); Hong Zhang, Tegemheim (DE)

(73) Assignee: Siemens Aktiengesellschaft, Munich (DE)

( * ) Notice: Subject to any disclaimer, the term of this patent is extended or adjusted under 35 U.S.C. 154(b) by 9 days.

(21) Appl. No.: 10/257,491

(22) PCT Filed: Apr. 10, 2001

(86) PCT No.: PCT/DE01/01395

§ 371 (c)(1),
(2), (4) Date: Oct. 9, 2002

(87) PCT Pub. No.: WO01/77503

PCT Pub. Date: Oct. 18, 2001

(65) Prior Publication Data

US 2003/0221415 A1 Dec. 4, 2003

(30) Foreign Application Priority Data

Apr. 11, 2000 (DE) .......................................... 100 17 931

(51) Int. Cl.$^7$ ................................................. F01N 3/00
(52) U.S. Cl. ............................. 60/277; 60/274; 60/276; 60/285
(58) Field of Search ........................... 60/274, 276, 277, 60/285

(56) References Cited

U.S. PATENT DOCUMENTS 5,158,059 A 10/1992 Kuroda ....................... 123/690
5,359,853 A * 11/1994 Shimizu ...................... 60/276
5,412,941 A * 5/1995 Suzuki et al. ................ 60/276
5,732,553 A * 3/1998 Mitsutani .................... 60/276
5,737,917 A * 4/1998 Nagai ......................... 60/276
5,743,086 A * 4/1998 Nagai ......................... 60/276
5,862,661 A * 1/1999 Zhang et al. ................ 60/274
5,875,628 A * 3/1999 Mitsutani .................... 60/276
6,105,366 A    8/2000 Zhang

FOREIGN PATENT DOCUMENTS

| DE | 35 00 594 A1 | 1/1985 | ........... F02D/41/14 |
| DE | 42 11 116 A1 | 10/1993 | ............. F01N/3/20 |
| DE | 694 03 288 T2 | 10/1997 | |
| DE | 197 52 965 A1 | 6/1999 | |
| DE | 694 14 941 T2 | 8/1999 | |
| DE | 198 11 574 A1 | 9/1999 | |
| DE | 198 28 928 A1 | 1/2000 | |

* cited by examiner

*Primary Examiner*—Binh Q. Tran
(74) *Attorney, Agent, or Firm*—David M. Thimmig; Mayer, Brown, Rowe & Maw LLP

(57) ABSTRACT

A method for diagnosing an exhaust gas cleaning system of a lambda-controlled internal combustion engine where a catalyst is subjected to a specific oxygen load which is greater than the normal operating load, by increasing the surface covered by the oscillation of a signal of a pre-catalyst lambda probe according to a set value. The exhaust gas cleaning system can be tested by evaluating the oscillation of a signal of a post-catalyst lambda probe. In the event this diagnosis shows a defect in the exhaust gas cleaning system without the area covered by the oscillation of the probe signal of the pre-catalyst lambda probe having had to be increased to or beyond a set value, the pre-catalyst lambda probe is defective. Otherwise, it can be concluded that the catalyst is defective.

14 Claims, 2 Drawing Sheets

METHOD FOR DIAGNOSING AN EXHAUST GAS CLEANING SYSTEM OF A LAMBDA-CONTROLLED INTERNAL COMBUSTION ENGINE

This application is a 371 of PCT/DE01/01395 filed Apr. 10, 2001.

BACKGROUND OF INVENTION

The invention relates to a method for diagnosing an exhaust gas cleaning system in the exhaust section of a lambda-controlled internal combustion engine having a 3-way catalytic converter, a binary pre-catalyst lambda sensor connected upstream of the catalytic converter, and a post-catalyst lambda sensor connected downstream of the catalytic converter.

In an exhaust gas cleaning system with two lambda sensors, a pre-catalyst lambda sensor upstream of the catalytic converter is used as a measuring sensor. A post-catalyst lambda sensor downstream of the catalytic converter serves as a monitoring sensor for monitoring and compensating for a change in the static or dynamic properties of the pre-catalyst lambda sensor which would lead to an increase in emissions. Usually, both lambda sensors have a two-point characteristic, and the voltage signal which they emit is dependent on the oxygen content in the exhaust gas. The oxygen content in the exhaust gas is in turn dependent on the mix which has been fed to the internal combustion engine. If the mix is lean (lambda>1), the output voltage from a binary lambda sensor is usually below 100 mV, changes almost as an abrupt jump in the region of lambda=1 and, when the mix is rich (lambda<1), reaches over 0.7 V; this is known as a two-point characteristic.

The dynamic and static properties of the pre-catalyst lambda sensor are altered by sensor aging and poisoning. As a result, the control position of the lambda control is shifted. For example, phosphorus poisoning may lead to an asymmetrical change in the sensor response time and therefore to a lean shift in the sensor control out of the optimum lambda range for the catalytic conversion. As a result, by way of example, the $NO_x$ emissions may rise beyond a permitted limit. The post-catalyst lambda sensor is used as a monitoring sensor for monitoring the catalytic conversion and for fine control of the mix in order always to be able to maintain the lambda value which is most favorable for conversion. Use is made of the fact that the two-point characteristic of the post-catalyst lambda sensor, on account of the conversion capacity, which also has a damping effect, of the catalytic converter, approximately changes into a linear characteristic within a very limited lambda range. This method, which is usually known as trimming or guide control, is known, for example, from DE 35 00 594 C2.

The prior art has disclosed numerous methods for diagnosing or checking a catalytic converter, for example DE 41 28 823 A1, which determines the oxygen storage capacity of a 3-way catalytic converter by recording the time required to empty or fill the catalytic converter with oxygen and calculating the quantity of oxygen from this time. For this method, a lambda sensor with wide-band characteristics, i.e. the signal of which changes proportionally to the lambda value, is imperative upstream of the catalytic converter.

However, the known methods have the drawback that, if the pre-catalyst lambda sensor is defective, a defective catalytic converter is often diagnosed, even though unacceptable levels of emissions are not yet being discharged. According to the prior art, it is not possible to differentiate between a catalytic converter defect and a failure of the pre-catalyst lambda sensor. Furthermore, the high oxygen loading/discharge, which is required for diagnosis according to the prior art, often leads to an undesirable level of pollutant emissions, since the catalytic converter is then no longer operated in its optimum range. Finally, wide-band lambda sensors are relatively expensive. Methods which are based on less expensive binary lambda sensors, i.e. lambda sensors with a two-point characteristic, have not hitherto been worthy of comparison with regard to their diagnosis capacity.

SUMMARY OF THE INVENTION

It is an object of the present invention to provide a method for diagnosing an exhaust gas cleaning system of a lambda-controlled internal combustion engine which does not necessarily require the use of a binary lambda sensor and which makes it possible to differentiate between a defect in the pre-catalyst lambda sensor and a failure of the catalytic converter.

This object is achieved by the invention wherein the oxygen storage capacity of the catalytic converter, which is a measure of its conversion capacity, is used to diagnose the exhaust gas cleaning system. The catalytic converter is subjected to a load which is brought about by fluctuation of the fuel/air ratio about the stoichiometric point and which is greater than the operating load which occurs with standard binary lambda control. However, a certain maximum catalytic converter load is not exceeded. The load is predetermined by influencing the oscillation of the fuel/air ratio and therefore the signal from the pre-catalyst lambda sensor. For diagnosis, the oscillation characteristic of the signal from the post-catalyst lambda sensor is evaluated. The fluctuating load is adsorbed to a greater or lesser extent in the catalytic converter depending on the oxygen storage capacity of the catalytic converter. The oscillation of the signal from the post-catalyst lambda sensor therefore differs depending on the oxygen storage capacity of the catalytic converter. Measurements carried out on a catalytic converter which has just fallen below the predetermined oxygen storage capacity, and therefore the desired conversion capacities, can be used to determine a desired range for the oscillation characteristic of the signal from the post-catalyst lambda sensor. A catalytic converter of this type is usually known as a limit catalytic converter.

If the oscillation is greater, i.e. the amplitude or included area is larger, the diagnosed catalytic converter is worse than the limit catalytic converter.

In a preferred embodiment of the method, the loading of the catalytic converter is set by controlling the fluctuation of the fuel/air ratio in such a way that the oscillation of the signal from the pre-catalyst lambda sensor includes a certain minimum area. The oxygen mass mO2 which is introduced into the catalytic converter within a half period of the oscillation can be calculated according to the following equation:

$$mO2 = 21\%(\text{lambda}-1)/\text{lambda} \; MAF \; T\tfrac{1}{2}$$

where MAF is the mass flow of fresh gas sucked in. mO2 is the oxygen mass which is fed to the catalytic converter during the half period of the lambda control in which the mix is lean. By varying the duration of the half period T½, it is therefore possible to set the catalytic converter loading, i.e. the quantity of oxygen introduced into the catalytic converter. By correspondingly varying the duration of the other (rich) half period, it is possible to vary the catalytic converter load and nevertheless to keep the mix stoichiometric on average. The terms "loading" and "load" are therefore used interchangeably.

In a preferred embodiment of the invention, with a binary lambda control the P-jump delay time is adjusted, with the result that T½ changes. To ensure that the internal combustion engine is nevertheless on average supplied with a stoichiometric mix, the P-jump delay time must vary in the same way both for the jump from lean to rich and for the jump from rich to lean. The catalytic converter load which is predetermined in this manner can be oriented to the emission limits which are to be checked.

Stipulating the loading has the advantage of being significantly less sensitive to load/rotational speed variations than known methods. Particularly at low engine loads or rotational speeds, good diagnosis of the catalytic converter is still possible.

The trimming control likewise has an effect on the P-jump delay time, but only on the delay time for one jump, either from lean to rich or from rich to lean. This different or one-sided change in the P-jump delay time means that the trimming control compensates for age-related changes in the pre-catalyst lambda sensor. Changes of this type generally lead to a shift in the lambda=1 working point of the sensor.

If it is established that the durations of one or both half periods cannot be increased as desired, since the acceptable P-jump delay time would be exceeded either for the lean to rich jump or for the rich to lean jump, and the diagnosis through the monitoring of the signal from the post-catalyst lambda sensor nevertheless indicates a defective exhaust gas cleaning system on account of an unacceptable oscillation in the signal from the post-catalyst lambda sensor, the pre-catalyst lambda sensor is defective. In such a case, the trimming control has compensated for a fault in the pre-catalyst lambda sensor all the way to the maximum permissible degree. Therefore, in all probability the unacceptable oscillation in the signal from the post-catalyst lambda sensor during diagnosis of the exhaust gas cleaning system is attributable to a defective pre-catalyst lambda sensor.

The signal from the post-catalyst lambda sensor is preferably evaluated by determining the area included by the oscillation of this signal. The period which is predetermined by the fluctuation in the fuel/air ratio and therefore by the oscillation in the signal from the pre-catalyst lambda sensor is of crucial importance to the desired characteristic of the oscillation. Therefore, the area which is included by the oscillation of the signal from the post-catalyst lambda sensor can be determined particularly easily by integrating or summing the amount of deviation from the mean of the signal from the post-catalyst lambda sensor over one period of the oscillation of the signal from the pre-catalyst lambda sensor. This period-synchronous integration eliminates the period determination at the signal from the post-catalyst lambda sensor.

A value which is characteristic of the oxygen storage capacity of the catalytic converter can be obtained from this integral or sum which describes the area. It is possible to weight this value still further with operating parameters such as rotational speed and engine load to give an emission index, so that the diagnosis can be made independently of an emission limit value being exceeded.

Furthermore, the diagnosis will preferably be discontinued when the lambda control presents a certain control deviation. In such a case, a load caused by varying the P-jump delay time, for example, would lead to an unacceptable increase in emissions.

Advantageous refinements of the invention form the subject matter of the subclaims.

BRIEF DESCRIPTION OF THE DRAWINGS

The following text provides a more detailed description of exemplary embodiments of the method according to the invention with reference to the drawing, in which.

DETAILED DESCRIPTION OF THE PREFERRED EMBODIMENTS

Figure 1:
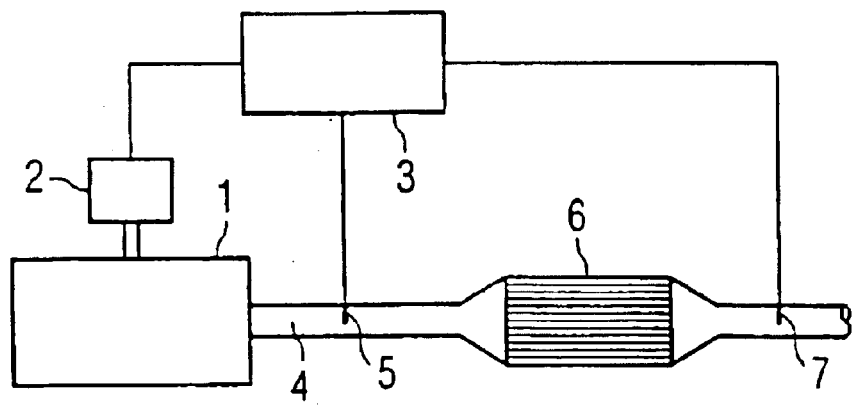
FIG. 1 diagrammatically depicts an internal combustion engine for carrying out the method according to the invention.

FIG. 1 shows an internal combustion engine 1 having a fuel supply system 2 and a control unit 3. The fuel supply system 2 is actuated by the control unit 3 via lines (not shown in more detail) and is responsible for distributing fuel to the internal combustion engine 1. In the exhaust section 4 thereof there is a lambda-controlled catalytic converter 6. To carry out the lambda control, a pre-catalyst lambda sensor 5 is provided upstream of the catalytic converter 6 and a post-catalyst lambda sensor 7 is provided downstream of the catalytic converter, for measuring the lambda value. Both lambda sensors have a two-point characteristic and supply their measured values to the control unit 3 via lines (not shown in more detail). The values from further sensors, in particular the rotational speed, the engine load, the catalytic converter temperature, etc. are also fed to the control unit 3. The control unit 3 uses these values to control operation of the internal combustion engine 1.

When the internal combustion engine 1 is operating, the catalytic exhaust-gas treatment in the exhaust section 4 is carried out with the aid of the catalytic converter 6 in the following way: The supply of fuel in the fuel supply system 2 is controlled in such a way that the signal from the pre-catalyst lambda sensor 5 executes an oscillation about lambda=1. With a normal, fully functioning lambda sensor, a voltage level of 450 mV corresponds to the value lambda=1. The signal from the pre-catalyst lambda sensor 5 oscillates about this value, so that on average the catalytic converter 6 receives exhaust gas with a lambda value=1.

The post-catalyst lambda sensor 7 measures the lambda value in the treated exhaust gas downstream of the catalytic converter 6. Its measured value is used by the control unit 3 to effect trimming control, i.e. the measured value from the post-catalyst lambda sensor 7 is used for fine adjustment of the mean of the oscillation of the pre-catalyst lambda sensor 5. This trimming control with the aid of the post-catalyst lambda sensor 7 makes it possible to compensate for a long-term drift in the pre-catalyst lambda sensor 5. If the signal level from the pre-catalyst lambda sensor 5 corresponding to the lambda value=1 shifts, this does not lead to a deterioration in the exhaust-gas treatment in the catalytic converter 6, since the trimming control measures this shift with the aid of the post-catalyst lambda sensor 7 and causes the control unit 3 to compensate for it. This is achieved by the P-jump delay time of the lambda control being changed on one side. The pre-catalyst lambda sensor signal therefore has an asymmetric oscillation, the duration of the lean half period of which differs from the duration of the rich half period. However, since only a changed response performance of the pre-catalyst lambda sensor 5 is compensated for, the fluctuation in the fuel/air ratio with which the internal combustion engine 1 is supplied via the fuel supply system 2 is nevertheless around lambda=1.

Figure 2:
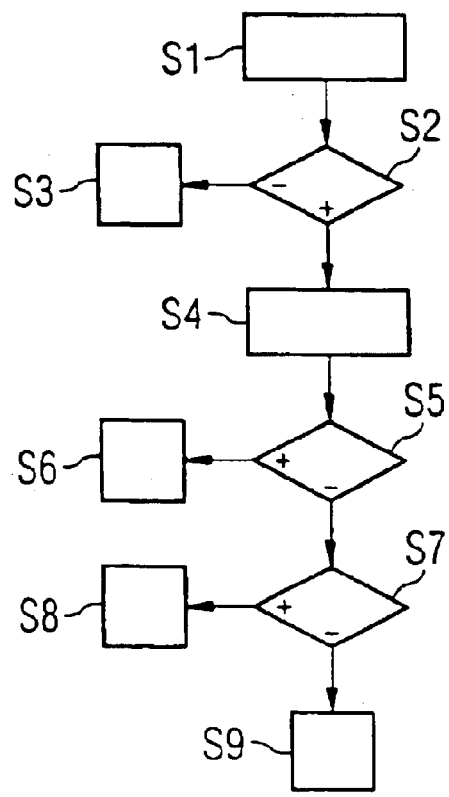
FIG. 2 shows a block diagram of a schematic method sequence.

To diagnose the exhaust gas cleaning system, the method illustrated as a block diagram in FIG. 2 is used. In this figure, the reference symbols starting with S denote the steps involved in the method.

First of all, in step S1, the area included by the oscillation of the sensor signal from the post-catalytic lambda sensor in the elapsed period is determined. This is carried out on the basis of the lambda control parameters, i.e. as a function of the operating point. Then, an increase value is calculated for the P-jump delay time, allowing the area to reach a defined desired value, which is required for diagnosis of the exhaust gas cleaning system, for the next period. Then, the P-jump delay time of the lambda control is altered by the increase value, so that the oscillation of the signal from the pre-catalyst lambda sensor includes the desired value area. Therefore, the change in the P-jump delay time effects a change in the duration of the half period T½, the effect of which on the oxygen mass mO2 supplied to the catalytic converter is in accordance with the following equation:

$$mO2 = 21\%(lambda-1)/lambda \; MAF \; T\tfrac{1}{2}$$

where MAF is the mass flow of fresh gas sucked in. The oxygen mass mO2 which is to be set is therefore linked directly, via the above equation, to the duration of the half period, and therefore the P-jump delay time which is set at the lambda control.

The P-jump delay time is changed in the same way for the lean to rich jump and for the rich to lean jump, so that both the period duration T½ in which the internal combustion engine is supplied with lean mix and the period duration T½ in which the internal combustion engine is supplied with rich mix are lengthened. Therefore, to select the change in the P-jump delay time, the starting point is the desired value area which is to be set as a function of the operating point and is linked to the oxygen mass mO2, so that a check is carried out for a defined emission limit value. These statements, on the basis of which aspects the oxygen mass mO2 is to be selected, will be dealt with in more detail below.

In step S2, it is checked whether the change in the P-jump delay time is associated with a lengthening. If this is not the case ("−" branch), in step S3 a pre-catalyst lambda sensor mark is set. Otherwise, the method continues directly ("+" branch) to step S4. If the change in the P-jump delay time leads to a shortening with respect to the value which is present with the current control, this means that the pre-catalyst lambda sensor must be defective, since the trimming controller, by acting on the lambda control, has already set the P-jump delay time to a maximum permissible value, which is so high that the desired value area can no longer be formed.

In step S4, the area included by the oscillation of the sensor signal from the post-catalyst lambda sensor is determined. The nature of this determination is explained in more detail below.

Step S5 asks whether this area remains below a limit value. If so, in step S6 the exhaust gas cleaning system is diagnosed as functional. If not ("−" branch), the method continues with step S7. In this case, the exhaust gas cleaning system is defective.

To be able to qualify the fault in the exhaust gas cleaning system with even greater accuracy, step S7 asks whether the pre-catalyst lambda sensor mark has been set. If so ("+" branch), in step S7 only the pre-catalyst lambda sensor is diagnosed as defective. If not ("−" branch), only a catalytic converter failure is diagnosed in step S9.

In step S1, the diagnosis method exposes the catalytic converter 6 to a certain load which is greater than the standard operating load. This can be understood particularly well from the curves shown in FIG. 3.

Figure 3:
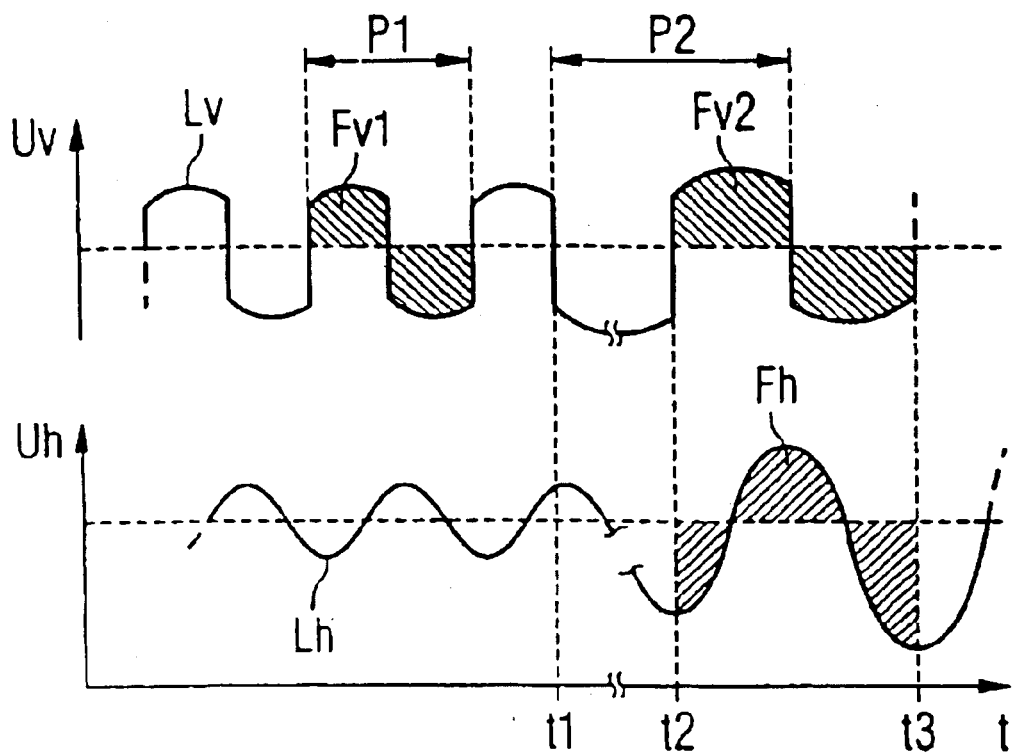
FIG. 3 shows curves of the signals from the pre-catalyst lambda sensor and the post-catalyst lambda sensor.

The upper curve in FIG. 3 plots the sensor voltage Uv of the pre-catalyst lambda sensor 5. The sensor signal Lv executes a periodic oscillation about a mean. The signal Lv in this case corresponds to a fully functioning pre-catalyst lambda sensor 5, since the oscillation is completely symmetrical. It has not hitherto been necessary for the trimming control to intervene, and the dashed line corresponds to precisely the stoichiometric mix. The area Fv1 which is included by the sensor signal Lv represents the changing oxygen loading of the catalytic converter 6. Components of the area which lie above the dashed line correspond to an oxygen discharge during supply with a rich mix, while components of the area which lie below the dashed line represent an introduction of oxygen with a lean mix. The oscillation of the sensor signal Lv takes place with a certain period P1, the oscillation being symmetrical in the case illustrated. If the pre-catalyst lambda sensor 5 were in an aged state, the two components of the area Fv1 would not be of equal size, since one of the two half periods would be longer and the other shorter as a result of the intervention of the trimming control. In the situation illustrated, however, T½ is equal to precisely half of P1.

The lower curve plots the sensor voltage Uh of the post-catalyst lambda sensor 7. The sensor signal Lh likewise executes an oscillation about the value corresponding to the stoichiometric mix. On account of the oxygen-storing and catalytic action of the catalytic converter 6, this oscillation is very much smaller, i.e. the oscillation includes a very much smaller area. In FIG. 3, the oscillation is illustrated on an enlarged scale in order to improve clarity. The sensor signal Lh oscillates in a substantially fixed phase relationship with respect to the sensor signal Lv, since ultimately the fluctuation in the fuel/air ratio is the determining factor for both oscillations. However, the sensor signal Lh is temporally offset with respect to the sensor signal Lv, since from the position of the pre-catalyst lambda sensor 5 to the location of the post-catalyst lambda sensor 7 there is a certain propagation time required for the gas flowing in the exhaust section 4.

If, in step S1, the area Fv1 which is included by the signal Lv is increased as a result of the P-jump delay time being increased, the sensor signal Lv oscillates with a longer period P2. In accordance with the equation given above, the area Fv2 which is then included by the sensor signal Lv represents an increased loading or load of the catalytic converter 6. The difference between the areas Fv1 and Fv2 is required in order to diagnose the catalytic converter 6 with a view to maintaining defined emission limit values. The way in which the area Fv2 is to be selected is explained in more detail below. In FIG. 3, the change from the area Fv1 to the area Fv2 was carried out at time t1.

With a certain time delay, the sensor signal Lh from the post-catalyst lambda sensor 7 also presents the longer period P2 in the same way as the sensor signal Lv and a greater oscillation magnitude. For simplicity's sake, the time delay is indicated in FIG. 3 by an interruption in the time axis. Obviously, this time delay is dependent on the gas propagation time between the pre-catalyst lambda sensor 5 and the post-catalyst lambda sensor 7, which is in turn dependent on the rotational speed. Therefore, it is necessary to wait for a certain time after the area Fv2 has been established at the sensor signal Lv from the pre-catalyst lambda sensor 5 before evaluating the sensor signal Lh from the post-catalyst lambda sensor 7. This time is dependent on the rotational speed and takes account of the abovementioned gas propagation time. Then, in period-synchronous fashion with respect to the oscillation of the sensor signal Lv, the area Fh which is included by the oscillation of the sensor signal Lh from the post-catalyst lambda sensor 7 is determined.

This area Fh can be determined by subjecting the sensor signal Lh to a strong low-pass filtering or temporal averaging in order to determine the mean of the sensor signal Lh, which is illustrated as a dashed line in FIG. 3. Then at any time beyond time t2 at which a zero crossing of the sensor signal Lv has been determined, the difference between the mean value and the current sensor voltage Uh is determined and integrated. This integration, which may also be replaced by a summing function, takes place by time t3, at which the next-but-one zero crossing of the sensor signal Lv from the pre-catalyst lambda sensor 5 after time t2 has been determined. One period P2 has then concluded. The sensor signal Lh from the post-catalyst lambda sensor 7 is therefore evaluated in period-synchronous fashion with respect to the sensor signal Lv from the pre-catalyst lambda sensor 5.

The area Fh which has been determined in this way is then subjected to the threshold value comparison of step S5 from FIG. 2. An oxygen quantity can be calculated from the area Fh as diagnosis value D.

Figure 4:
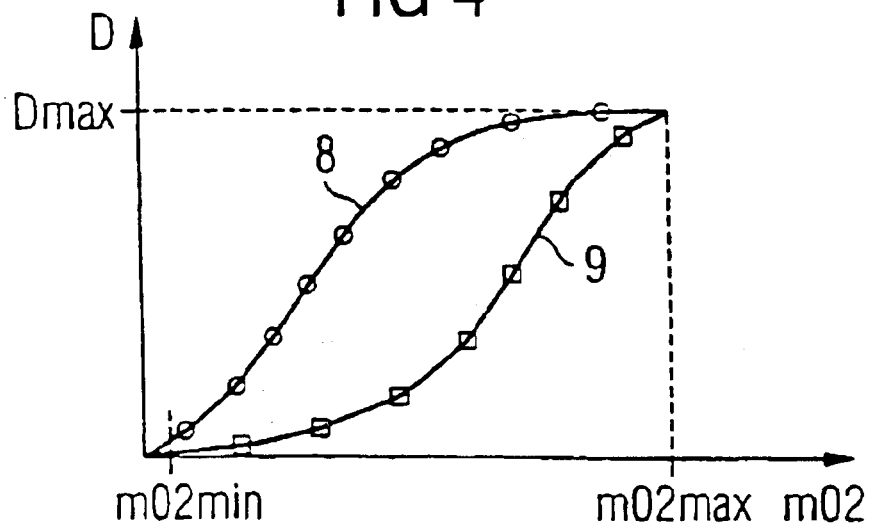
FIG. 4 plots a diagnosis value against the stored oxygen quantity for two different catalytic converters.

The area Fv2 corresponds to an oxygen quantity mO2. FIG. 4 illustrates how the diagnosis value D, which is linked to the area Fh, is related to the oxygen quantity mO2, which is predetermined by increasing the area Fv1 to form the area Fv2.

FIG. 4 shows the diagnosis value D as a function of the oxygen quantity. Curve 9 represents a new catalytic converter 6, curve 8 represents a limit catalytic converter which has undergone the maximum permissible deterioration. Any further deterioration in this limit catalytic converter would lead to acceptable emission limits being exceeded.

The curves 8 and 9 in FIG. 4 include a known hysteresis. The diagnosis value approaches a maximum Dmax which is reached when the maximum oxygen storage quantity mO2 max is reached. This maximum oxygen quantity mO2 max is the quantity which the catalytic converter 6 is able to absorb in the optimum scenario, i.e. when new. If further oxygen is introduced, it completely passes through the catalytic converter 6 and is discharged at its outlet. A loading which exceeds this value mO2 max is therefore never appropriate. Therefore, there is a natural upper limit for the oxygen quantity mO2 which is to be set by varying the area Fv1. A lower limit results from the loading which occurs in standard operation, indicated by mO2 min in FIG. 4.

The oxygen quantity mO2 which is to be set for diagnosis, and therefore the desired value for Fv2 which is to be set, result from a number of criteria. Firstly, the diagnosis interval between the new catalytic converter 6, as represented by the curve 9, and the limit catalytic converter as reflected in curve 8, should be as great as possible. This is the range of the hysteresis curve in which the maximum difference at the diagnosis value D is present for a given oxygen quantity mO2. Secondly, the oxygen quantity mO2 which is to be set should be as close as possible to the standard operating level, e.g. to mO2 min. This is because it is then ensured that additional emissions caused by the diagnosis are as far as possible avoided.

Since the curves 8 and 9 in FIG. 4 are, of course, shown in idealized form and in reality there will be a certain scatter, by weighing up the diagnosis interval for the diagnosis value D and the greatest possible proximity to the oxygen quantity mO2 min, which is present in normal operation, it will be possible to weigh up the situation. In this context, account should also be taken of the fact that the distance on the scale for the diagnosis value D is directly linked to the emission limit value which can be diagnosed by the diagnosis and is maintained by the exhaust gas cleaning system. The greater the distance on the scale for the diagnosis value D, the smaller the deterioration in the emission limit values in the exhaust gas cleaning system it is possible to diagnose. The method therefore allows the oxygen quantity mO2 with which the catalytic converter is loaded for diagnosis to be oriented to the diagnosis value D, i.e. to the quality of the exhaust gas cleaning system which is to be maintained. The load on the catalytic converter, which always leads to increased emissions, will therefore be kept as low as possible.

What is claimed is:

1. A method for diagnosing an exhaust gas cleaning system in an exhaust section of a lambda-controlled internal combustion engine having a 3-way catalytic converter, a binary pre-catalyst lambda sensor connected upstream of the catalytic converter, and a post-catalyst lambda sensor connected downstream of the catalytic converter, the method comprising the steps of:

operating the internal combustion engine in such a way during lambda control that a signal from the pre-catalyst lambda sensor executes a defined, periodic oscillation about lambda=1, a signal from the post-catalyst lambda sensor likewise executing an oscillation;

setting the oscillation of the signal from the pre-catalyst lambda sensor, by influencing the lambda control, to a defined loading of the catalytic converter, which changes periodically with the oscillation and is above a normal operating loading;

diagnosing a defect in the exhaust gas cleaning system if an oscillation characteristic of the signal from the post-catalyst lambda sensor lies outside a desired range;

determining an area which is included by the oscillation of the signal from the pre-catalyst lambda sensor when said lambda control is influenced in such a way that the area which is included by the oscillation of the signal from the pre-catalyst lambda sensor adopts or exceeds a desired value;

determining an area included by the oscillation of the signal from the post-catalyst lambda sensor;

diagnosing a defect in the exhaust gas cleaning system if the area included by the oscillation of the signal from the post-catalyst lambda sensor or a sum of the post-catalyst lambda sensor signals exceeds a threshold value; and influencing the area which is included by the oscillation of the signal from the pre-catalyst lambda sensor by altering a proportional component of the lambda control.

2. The method as claimed in claim 1, further comprising the step of changing a P-jump delay time in the same way for a jump from rich to lean and for a jump from lean to rich.

3. The method as claimed in claim 1, further comprising the step of diagnosing a defect in the pre-catalyst lambda sensor if it is necessary to influence the proportional component beyond a certain limit in order to influence the area which is included by the oscillation of the signal from the pre-catalyst lambda sensor.

4. The method as claimed in claim 1, further comprising the step of diagnosing a catalytic converter failure as the defect in the exhaust gas cleaning system if the influencing of the proportional component in order to influence the area which is included by the oscillation of the signal from the pre-catalyst lambda sensor remains below a certain limit.

5. A method for diagnosing an exhaust gas cleaning system in an exhaust section of a lambda-controlled internal combustion engine having a 3-way catalytic converter, a binary pre-catalyst lambda sensor connected upstream of the catalytic converter, and a post-catalyst lambda sensor connected downstream of the catalytic converter, the method comprising the steps of:

operating the internal combustion engine in such a way during lambda control that a signal from the pre-catalyst lambda sensor executes a defined, periodic oscillation about lambda=1, a signal from the post-catalyst lambda sensor likewise executing an oscillation;

setting the oscillation of the signal from the pre-catalyst lambda sensor, by influencing the lambda control, to a defined loading of the catalytic converter, which changes periodically with the oscillation and is above a normal operating loading;

diagnosing a defect in the exhaust gas cleaning system if an oscillation characteristic of the signal from the post-catalyst lambda sensor lies outside a desired range;

determining an area which is included by the oscillation of the signal from the pre-catalyst lambda sensor when said lambda control is influenced in such a way that the area which is included by the oscillation of the signal from the pre-catalyst lambda sensor adopts or exceeds a desired value;

determining an area included by the oscillation of the signal from the post-catalyst lambda sensor;

diagnosing a defect in the exhaust gas cleaning system if the area included by the oscillation of the signal from the post-catalyst lambda sensor or a sum of the post-catalyst lambda sensor signals exceeds a threshold value; and obtaining a value which is characteristic of an oxygen storage capacity of the catalytic converter from the area included by the oscillation of the signal from the post-catalyst lambda sensor.

6. A method for diagnosing an exhaust gas cleaning system in an exhaust section of a lambda-controlled internal combustion engine having a 3-way catalytic converter, a binary pre-catalyst lambda sensor connected upstream of the catalytic converter, and a post-catalyst lambda sensor connected downstream of the catalytic converter, the method comprising the steps of:

operating the internal combustion engine in such a way during lambda control that a signal from the pre-catalyst lambda sensor executes a defined, periodic oscillation about lambda=1, a signal from the post-catalyst lambda sensor likewise executing an oscillation;

setting the oscillation of the signal from the pre-catalyst lambda sensor, by influencing the lambda control, to a defined loading of the catalytic converter, which changes periodically with the oscillation and is above a normal operating loading;

diagnosing a defect in the exhaust gas cleaning system if an oscillation characteristic of the signal from the post-catalyst lambda sensor lies outside a desired range; and integrating or summing the signals of the pre-catalyst lambda sensor and determining the area included by the oscillation of a signal by the amount of deviation from a mean of the oscillation over one period of the oscillation of the pre-catalyst lambda sensor being integrated or summed.

7. The method as claimed in claim 2, further comprising the step of diagnosing a defect in the pre-catalyst lambda sensor if it is necessary to influence the proportional component beyond a certain limit in order to influence the area which is included by the oscillation of the signal from the pre-catalyst lambda sensor.

8. The method as claimed in claim 2, further comprising the step of diagnosing a catalytic converter failure as the defect in the exhaust gas cleaning system if the influencing of the proportional component in order to influence the area which is included by the oscillation of the signal from the pre-catalyst lambda sensor remains below a certain limit.

9. The method as claimed in claim 3, further comprising the step of diagnosing a catalytic converter failure as the defect in the exhaust gas cleaning system if the influencing of the proportional component in order to influence the area which is included by the oscillation of the signal from the pre-catalyst lambda sensor remains below a certain limit.

10. The method as claimed in claim 3, further comprising the step of discontinuing the diagnosis when the lambda control exceeds a certain control deviation.

11. The method as claimed in claim 5, further comprising the step of discontinuing the diagnosis when the lambda control exceeds a certain control deviation.

12. The method as claimed in claim 9, further comprising the step of discontinuing the diagnosis when the lambda control exceeds a certain control deviation.

13. The method as claimed in claim 4, further comprising the steps of integrating or summing the signals of the pre-catalyst lambda sensor and determining the area included by the oscillation of a signal by the amount of deviation from a mean of the oscillation over one period of the oscillation of the pre-catalyst lambda sensor being integrated or summed.

14. The method as claimed in claim 5, further comprising the steps of integrating or summing the signals of the pre-catalyst lambda sensor and determining the area included by the oscillation of a signal by the amount of deviation from a mean of the oscillation over one period of the oscillation of the pre-catalyst lambda sensor being integrated or summed.

\* \* \* \* \*